US009622252B2

(12) United States Patent
Kadiyala et al.

(10) Patent No.: US 9,622,252 B2
(45) Date of Patent: Apr. 11, 2017

(54) SYSTEMS AND METHODS FOR DYNAMIC WIDEBAND CHANNEL SELECTION

(71) Applicant: Uurmi Systems Private Limited, Hyderabad (IN)

(72) Inventors: Vamshi Krishna Kadiyala, Hyderabad (IN); Bheemarjuna Reddy Tamma, Hyderabad (IN); Manojku Mar Mandala, Hyderabad (IN); Nitesh Kumar Shah, Hyderabad (IN)

(73) Assignee: Uurmi Systems PVT. LTD, Hyderabad (IN)

( * ) Notice: Subject to any disclaimer, the term of this patent is extended or adjusted under 35 U.S.C. 154(b) by 417 days.

(21) Appl. No.: 14/193,326

(22) Filed: Feb. 28, 2014

(65) Prior Publication Data

US 2015/0249990 A1    Sep. 3, 2015

(51) Int. Cl.
*H04W 72/08*    (2009.01)
*H04W 28/20*    (2009.01)

(52) U.S. Cl.
CPC .......... *H04W 72/085* (2013.01); *H04W 28/20* (2013.01)

(58) Field of Classification Search
CPC ... H04W 72/00; H04W 72/005; H04W 72/04; H04W 72/0453; H04W 72/08; H04W 72/085
See application file for complete search history.

(56) References Cited

U.S. PATENT DOCUMENTS

| 9,125,219 B2* | 9/2015 | Hong ............... H04W 72/085 |
| 2014/0080535 A1* | 3/2014 | Gauvreau ............ H04W 16/14 |
| | | 455/513 |
| 2015/0009947 A1* | 1/2015 | Rangarajan ........... H04L 5/0062 |
| | | 370/330 |

* cited by examiner

*Primary Examiner* — Feben M Haile
(74) *Attorney, Agent, or Firm* — Next ip Law Group LLC

(57) ABSTRACT

Systems and methods for Dynamic Wideband Channel Selection with which a wireless Access Point gets the ability to dynamically decide and switch to better available channels with wider bandwidths for higher efficiency and throughput taking care of the restrictions applied by the regulatory domains in the widespread spectrum.

40 Claims, 9 Drawing Sheets

| Category | Spectrum Management Action | Dialog Token | Element id | Length | Measurement Token | Measurement Request Mode | Measurement Type | Measurement Request |

FIG. 2a

| Length | Enable | Request | Report | Duration Mandatory | Reserved |
|---|---|---|---|---|---|
| Measurement Request Mode ||||||

FIG. 2b

| Channel Number | Measurement Start Time | Measurement Duration |
|---|---|---|
| Measurement Request |||

FIG. 2c

| Category | Spectrum Management Action | Dialog Token | Element id | Length | Measurement Token | Measurement Report Mode | Measurement Type | Measurement Report |

FIG. 3a

| Measurement Report Mode |||||
| Late | Incapable | Refused | Reserved |

FIG. 3b

| Measurement Report ||||||
| Channel Number | Start Time | Duration | BSS | OFDM Preamble | Unidentified Signal | Radar | Unmeasured | Reserved |

FIG. 3c

| Category | Radio Management Action | Dialog Token | Number of Repetitions | Element id | Length | Measurement Token | Measurement Report Mode | Measurement Type | Measurement Report |
|---|---|---|---|---|---|---|---|---|---|

FIG. 4a

| Measurement Request Mode | | | | |
|---|---|---|---|---|
| Parallel | Enable | Request | Report | Duration Mandatory | Reserved |

FIG. 4b

| Measurement Request | | | |
|---|---|---|---|
| Operating Class | Channel Number | Randomization Interval | Measurement Duration |

FIG. 4c

| Category | Radio Management Action | Dialog Token | Element id | Length | Measurement Token | Measurement Report Mode | Measurement Type | Measurement Report |

FIG. 5a

| Measurement Report Mode | | | |
|---|---|---|---|
| Late | Incapable | Refused | Reserved |

FIG. 5b

| Measurement Report | | | | |
|---|---|---|---|---|
| Operating Class | Channel Number | Actual Measurement Start Time | Measurement Duration | Channel Load |

FIG. 5c

SYSTEMS AND METHODS FOR DYNAMIC WIDEBAND CHANNEL SELECTION

FIELD OF THE INVENTION

The present disclosure relates generally to a dynamic wideband channel selection method in a wireless network, and more particularly, to techniques for switching between an operating channel and a plurality of available channels in the widespread spectrum of 5 GHz.

BACKGROUND OF THE INVENTION

Wireless communication networks support wireless communication between various stations adapted according to various protocols and standards including IEEE 802.11, Bluetooth, advanced mobile phone services (AMPS), Global system for mobile communications (GSM), code division multiple access (CDMA), wireless application protocols (WAP), local multi-point distribution services (LMDS), multi-channel multi-point distribution systems (MMDS), and the like.

An IEEE 802.11 compliant wireless local area network (WLAN) links a plurality of stations to one or more access points (APs) that in turn may connect the stations to the Internet. Each access point utilizes one of a plurality of available channels to create a basic service set (BSS). A set of stations join the BSS to have a wireless communication via AP. The IEEE 802.11 standard started with unlicensed 2.4 GHz spectrum band and later expanded to unlicensed 5 GHz spectrum band. The 2.4 GHz band provides 3 orthogonal 20 MHz channels whereas the 5 GHz band provides 25 orthogonal 20 MHz channels. The IEEE 802.11n working group introduced a concept called "channel bonding" which refers to the concurrent use of two adjacent 20 MHz channels or a total of 40 MHz of spectrum bandwidth for a single, "bonded" communication channel. By providing twice the bandwidth of conventional 20 MHz channels, these bonded channels effectively achieve data transmission rates that are almost double those of the original 20 MHz channels. The IEEE 802.11ac standard operates on 5 GHz band and promises to provide very high data rate of up to 7 Gbps by using up to 160 MHz bandwidth and 8 spatial streams for data transmissions.

A part of the 5 GHz band on the other hand is utilized for the operation of various radar systems. Thus, while operating at 5 GHz in the regulatory domains, 802.11ac BSS can face interference from radar signals on some of the channels under Dynamic Frequency Selection (DFS) region. These channels that may face interference from radar signals are known as Dynamic Frequency Selection channels, and the remaining channels on the 5 GHz where no radar operations are allowed are known as non-DFS channels. The interference can also happen from the other WLANs (BSSs) operating in the same channel. Thus, the access point should have the intelligence to react to the interference that degrades the channel quality and the throughput below a desired threshold by dynamically switching the operating channel to an optimal channel.

The present art describes operation and channel selection on 20 MHz and 40 MHz channels only which was the case before the introduction of IEEE 802.11ac. Moreover, the present state of art addresses the channel selection problem in different ways such as by obtaining the channel quality and then selecting the best channel for operation or by considering the receiver signal strength indicator (RSSI) of each channel to choose the best channel.

In certain arts, the channel quality is measured in terms of receiver signal strength indicator (RSSI), Clear Channel Assessment (CCA) busy periods and periodicity; and a channel is selected based on the channel quality report for BSS operation. Further, certain techniques have been described wherein the access point determines interference on its operating wireless channel and considers RSSI and packet failures to choose the best channel to operate on.

However, the existing methods and systems related to channel switching and dynamic frequency allocation after detecting radar signal in the operating channel do not choose wide band channels as they do not consider the bandwidth of potential channels during channel switch. Moreover, the existing art does not address how to perform Dynamic Frequency Selection considering different bandwidths of available channels i.e., 20/40/80/160/80+80 MHz channels in the 5 GHz band of wireless LAN.

At present none of the existing methods related to Dynamic Frequency Selection, to the best of our knowledge, exploit different bandwidths that are made available as part of IEEE 802.11ac for wideband operation in an efficient manner. Also, they do not talk about retaining the primary channels for ensuring minimal disruption to the on-going Quality of Service (QoS) transmissions such as Voice and Video sessions while switching the channel. Moreover, the maximum mean effective isotropically radiated power (E.I.R.P.) restricted by the regulatory domains is not considered during dynamic frequency selection.

In order to utilize the wideband channels that are available under IEEE 802.11ac and optimally serve the stations in case of interference due to the presence of radar signal and other unwanted signals, there remains a need for a method and system for dynamically selecting best available wideband channels by monitoring the performance of the operating channel as well as the non-operating channels in 5 GHz regulatory domains.

BRIEF SUMMARY OF THE INVENTION

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present disclosure describes a network, method and wireless access point for Dynamic Wideband Channel Selection with which an Access Point of an IEEE 802.11 Basic Service Set (BSS) gets the ability to dynamically decide and switch to better available channels with wider bandwidths for higher efficiency and throughput taking care of the restrictions applied by the regulatory domains in the widespread spectrum of 5 GHz.

In one embodiment, a wireless communication network for dynamic selection of a wideband channel from a group of channels in an available band spectrum is described. The wireless communication network comprises a wireless access point operating in a wideband operating channel, and one or more stations that are communicatively coupled with the wireless access point. The wireless access point is enabled to detect radar signals in the wideband operating channel, compute and update a Transmission Failed to Attempted Ratio for the wideband operating channel, compute and update a wideband Transmission Failed to Attempted Ratio histogram for each of the possible channel bandwidths of the wideband operating channel, and send a Basic Spectrum Measurement Request frame, and a Channel Load Measurement Request frame. The one or more wireless stations from the list of associated stations with the access point are enabled to detect radar signals in one or more channels in the group of channels in the available band spectrum. The stations are enabled to generate and send a Basic Spectrum Measurement Report frame either autonomously or in response to the Basic Spectrum Measurement Request frame sent by the access point. Further, the stations are also enabled to generate and send a Channel Load Measurement Report frame in response to the Channel Load Measurement Request frame sent by the access point. The access point is configured to send the Basic Spectrum Measurement Request frame and the Channel Load Measurement Request frame to one or more selected stations based on a timer or trigger event, and it dynamically selects a wideband channel for operation from the group of channels in the available band spectrum based on the detection of radar signals in the channels, the Transmission Failed to Attempted Ratio for the wideband operating channel, the wideband Transmission Failed to Attempted Ratio histogram, the Basic Spectrum Measurement Report frames, and the Channel Load Measurement Report frames.

In another embodiment, a method for dynamically selecting a wideband channel from a group of channels in an available band spectrum is described. The method comprises the steps of:

a. detecting radar signals by the access point or by one or more of its associated stations;
b. periodically computing a wideband Transmission Failed to Attempted Ratio histogram at the access point,
c. sending of a Basic Spectrum Measurement Request frame and a Channel Load Measurement Request frame by the access point to one or more stations based on a trigger event or a timer;
d. generating and sending a Basic Spectrum Measurement Report frame and a Channel Load Measurement Report frame by one or more stations to the access point;
e. estimating quality of one or more available Wideband Channels by analyzing the corresponding Basic Spectrum Measurement Report frame, the corresponding Channel Load Measurement Report frame and based on the detection of radar signal;
f. selecting a wideband channel for operation from the available Wideband Channels estimated in step e based on the detection of radar signal in the operating channel, the wideband Transmission Failed to Attempted Ratio histogram, the Basic Spectrum Measurement Report frames, and the Channel Load Measurement Report frames.

In yet another embodiment, a wireless access point apparatus operating in an operating channel for dynamically selecting a wideband channel from a group of channels in an available band spectrum is described. The wireless access point comprises a radar detection module for detecting presence of radar signal in the operating channel, a frame generation module for generating a Basic Spectrum Measurement Request frame and a Channel Load Measurement Request frame, a timer for triggering an event for sending the Basic Spectrum Measurement Request frame and the Channel Load Measurement Request frame to one or more stations, a processor module for maintaining a channel quality table, estimating one or more available Wideband Channels and selecting a wideband channel for operation based on the estimated available Wideband Channels and detection of radar signal in the operating channel.

It is one of the objects of the present disclosure to provide a method, network and wireless access point for utilizing the wideband channels available under IEEE 802.11ac and optimally serve the stations. All the supported bandwidths i.e. 20/40/80/160/80+80 MHz are considered for increasing the possible number of wideband channels for the channel switch.

It is another object of the present disclosure to provide a network and wireless access point that monitors its performance on the operating channel and estimates the channel load of non-operating channels periodically or depending on some threshold based triggers for obtaining information regarding the channel quality of the operating and non-operating channels.

It is yet another object of the disclosure to provide a technique for dynamically deciding and switching to the best channel with wider bandwidths for higher efficiency and throughput taking care of the restrictions applied by the regulatory domains in the widespread spectrum of 5 GHz.

The present disclosure also describes a method for retaining the primary channel of the operating wideband channel for ensuring minimal disruption to the on-going QoS (Quality of Service) transmissions such as Voice and Video sessions while switching the channel.

It is another object of the disclosure to provide a network and method that takes into consideration the maximum mean E.I.R.P. restricted by the regulatory domains while switching to another wideband channel.

It is another object to provide a method for estimating the channel quality of the operating channel as well as non operating channels by varying the frequency of measurement requests as per the channel load levels of non-operating channels thereby minimizing the overhead on the basic service set.

It is yet another object to provide a wireless network and method for selecting isolated channels i.e. channels that are far away in the spectrum band from other existing BSS for initiating a new BSS.

BRIEF DESCRIPTION OF THE DRAWINGS

FIGS. 2a, 2b, and 2c illustrates a Basic Spectrum measurement request frame according to an embodiment.

FIGS. 3a, 3b, and 3c illustrates a Basic Spectrum measurement report frame according to an embodiment.

FIGS. 4a, 4b, and 4c illustrates a Channel load measurement request frame according to an embodiment.

FIGS. 5a, 5b, and 5c illustrates a Channel load measurement report frame according to an embodiment.

DETAILED DESCRIPTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments mainly describe the invention in view of IEEE 802.11 standards however the invention may be implemented irrespective of the standards and may be embodied in various forms.

Systems and methods for Dynamic Wideband Channel Selection with which an Access Point gets the ability to dynamically decide and switch to better available channels with wider bandwidths for higher efficiency and throughput taking care of the restrictions applied by the regulatory domains in the widespread spectrum.

Figure 1:
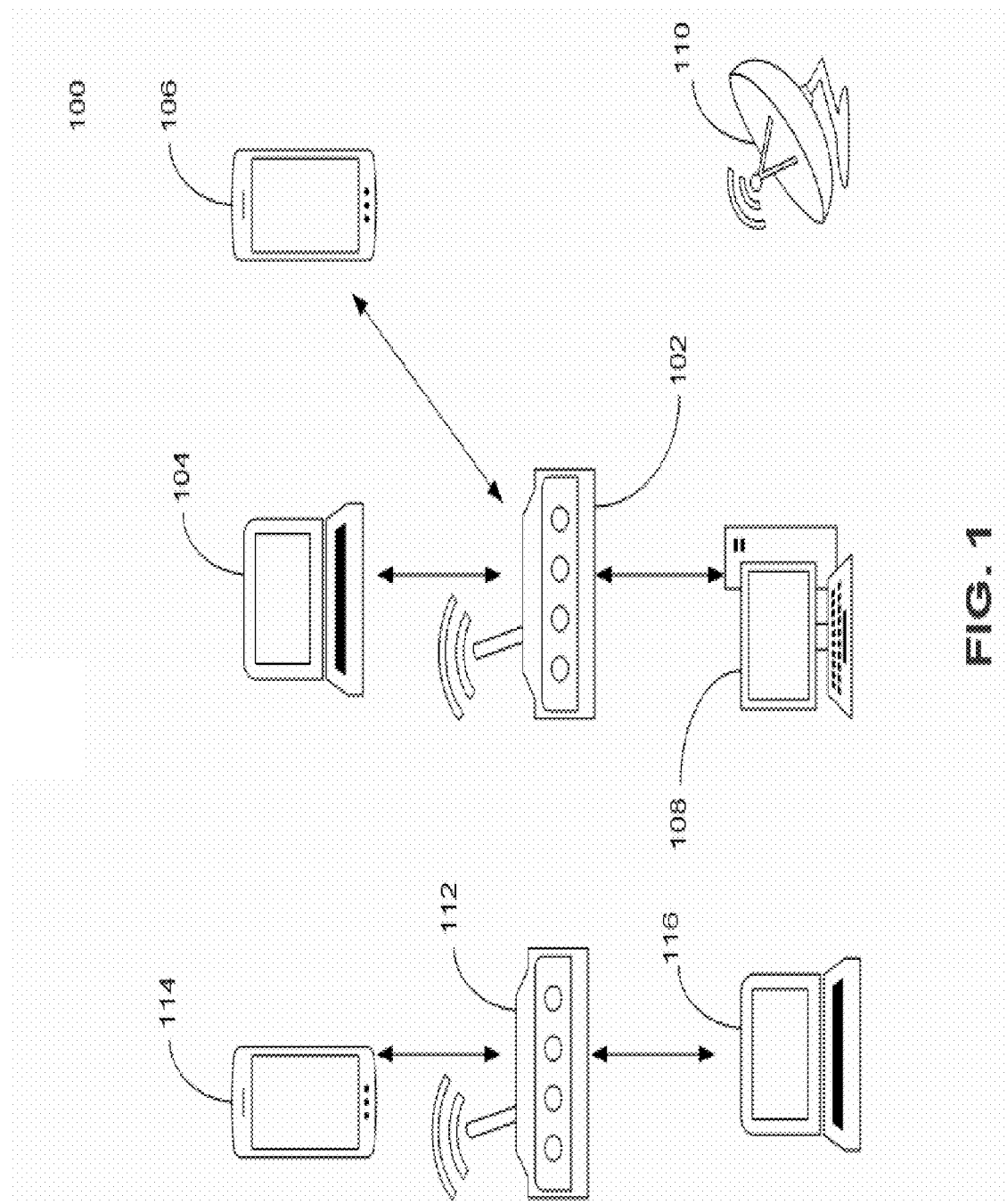
FIG. 1 depicts a wireless communication network for dynamic selection of a wideband channel from a group of channels in an available band spectrum, in accordance with an embodiment.

FIG. 1 illustrates an exemplary wireless communication network (100) having an access point (102) and one or more stations (104, 106, and 108) connected to the access point utilizing an operating channel. The access point (102) along with the stations (104,106, and 108) defines a Basic Service set (or BSS). In an aspect, the access point is a wireless access point in compliance with IEEE 802.11 standard. In another aspect, the wireless access point is an IEEE 802.11ac access point. Though the present description describes the invention using IEEE 802.11ac standard, however, a variation of the present invention may be implemented for other IEEE or non IEEE standards as well.

The 5 GHz frequency spectrum is also used by various radar systems (110) that may interfere with the functioning of the wireless communication network (100). A plurality of wideband channels may be utilized by the access point (102) for communicating with the one or more stations (104, 106, and 108). The wideband operating channel may be a combination of a primary channel with one or more available secondary channels. The primary channels available specifically under IEEE 802.11ac are primary 20 (P20), primary 40 (P40), and primary 80 (P80) depending on the operating bandwidth. The primary channels may be bonded with one or more secondary channels to create one or more wideband channels. The 20 MHz channel that is used for Beacon frame transmission is referred as primary 20 (P20). While operating on 40 MHz, the 20 MHz channel adjacent to primary 20 (P20) is referred as the secondary 20 (S20) channel. While operating on 80 MHz, primary 20 (P20) and secondary 20 (S20) forms primary 40 (P40); and the 40 MHz channel adjacent to primary 40 is referred as the secondary 40 channel. While operating on 160 MHz or 80+80 MHz, primary 40 (P40) and secondary 40 (S40) forms primary 80 (P80); and the 80 MHz channel other than primary 80 is referred as the secondary 80 channel (S80).

The systems and methods described herein support all the bandwidths support under IEEE 802.11ac namely 20/40/80/160/80+80 MHz for increasing the possible number of wideband channels. The bandwidth spectrum available for wireless communication may support more than one Basic service set including one or more access points (112) and one or more stations (114 and 116) and hence there may be interference between the basic service sets as well. In order to maintain the quality of service and to achieve a higher efficiency and throughput the access points (102) along with the stations (104,106, and 108) keep track of any radar signal present in any of the channels, presence of any other basic service set in any channel, and the channel performance of the operating as well as the non-operating channels. In an aspect, the access point (102) and the stations (104,106, and 108) may be provided with certain means for detecting the presence of a radar signal. Upon the detection of radar in a channel, the channel is unusable for a time period known as Non-Occupancy Period which is defined by the regulatory domains. In another aspect, the presence of BSS may be detected by means of an overlapping BSS (OBSS) scanning to determine the number of BSS present in each channel.

Figure 8:
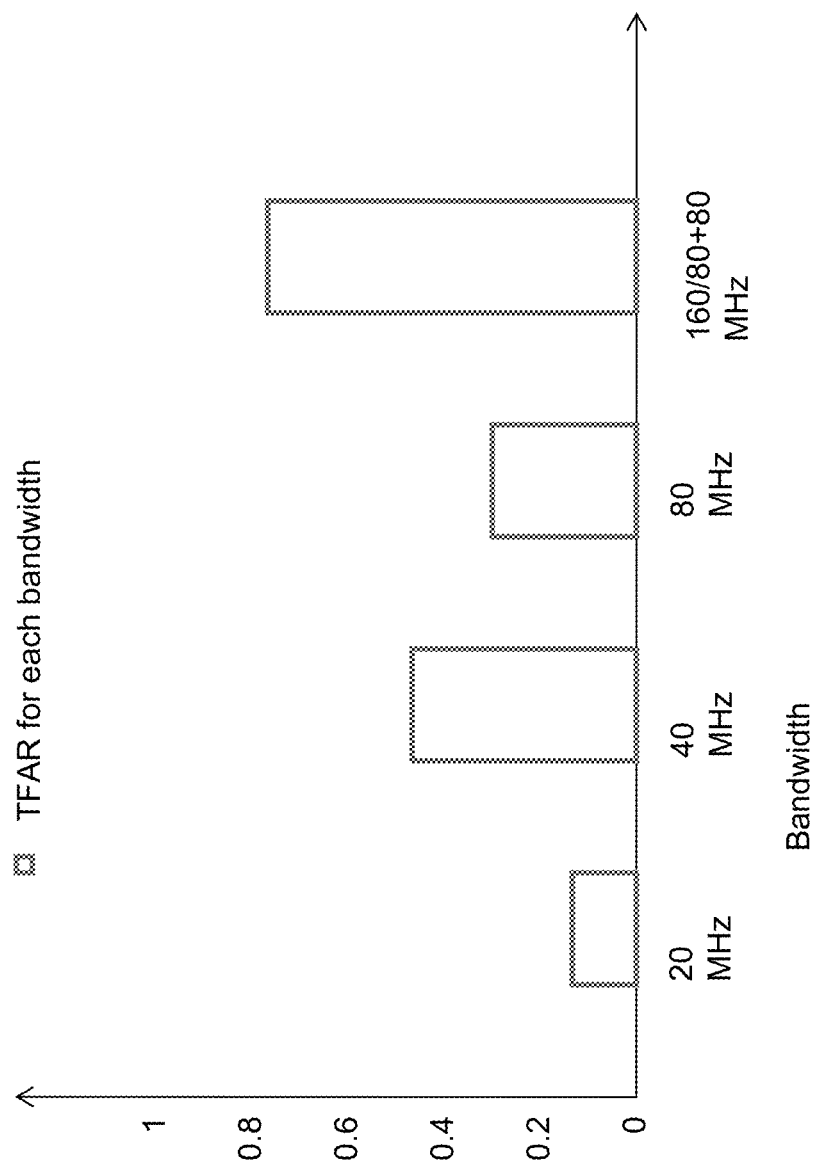
FIG. 8 depicts a Wideband Transmission Failed to Attempted Ratio histogram according to an exemplary embodiment of the present invention.

The access point (102) may also be facilitated with necessary means for generating a transmission failed to attempted ratio (TFAR) for the wideband operating channel. The transmission failed to attempted ratio is the ratio of the transmissions failed to the transmissions attempted. In an aspect, the transmission failed to attempted ratio may be calculated based on the acknowledgements/responses that are expected but not received by the access point for the total number of Data, Management and Control packets transmitted by the access point during measured time duration. The access point (102) may also be enabled to generate a wideband Transmission Failed to Attempted Ratio histogram for each of the possible channel bandwidths of the wideband operating channel. FIG. 8 illustrates a wideband Transmission Failed to Attempted Ratio (WTFAR) histogram in accordance with an exemplary embodiment. The WTFAR histogram contains the TFAR for each of the possible channel bandwidths viz., 20 MHz, 40 MHz, 80 MHz, 160 MHz and 80+80 MHz. In an aspect, the WTFAR histogram may be based on individual TFAR registers that may store the attempted history and failed history of the various possible channel bandwidths. While calculating the WTFAR a higher weightage is given to the old, aggregate value of TFAR. The TFAR may be calculated as ((weightage*previous TFAR)+((1-weightage)*(present failed/present attempted))). In an aspect, Transmission Failed to Attempted Ratio (TFAR) and wideband Transmission Failed to Attempted Ratio (WTFAR) may be reset after the channel switch.

The access point may be enabled to select one more stations amongst the stations of the BSS and send a Basic Spectrum Measurement Request frame and a Channel Load Measurement Request frame to one or more stations. In an aspect, the wireless access point selects the one or more stations for sending the Basic Spectrum Measurement Request frame and the Channel Load Measurement Request frame based on data traffic handled by the stations. FIGS. 2a, 2b, and 2c illustrates a Basic Spectrum Measurement Request frame and FIGS. 3a, 3b, and 3c illustrates a Channel Load Measurement Request frame in accordance with an embodiment.

In a related embodiment, the one or more stations (104, 106, and 108) may be enabled to detect a radar signal in one or more channels in the available band spectrum. The stations may be able to generate and send a Basic Spectrum Measurement Report and a Channel Load Measurement Report frame to the access point. In an aspect, the stations may autonomously generate and send the Basic Spectrum Measurement Report to access point upon detecting a radar signal in a channel. In another aspect, the stations may generate and send the Basic Spectrum Measurement Report to access point in response to a received Basic Spectrum Measurement request. In an aspect, the stations may generate and send the Channel Load Measurement Report frame in response to the received Channel Load Measurement Request frame. An exemplary Basic Spectrum Measurement Report frame is illustrated in FIGS. 4a, 4b, and 4c and an exemplary Channel Load Measurement Report frame is illustrated in FIGS. 5a, 5b, and 5c. In an aspect, the Channel Load Measurement Report frame may include a channel load field indicating the percentage of time the station sending the Channel Load Measurement Report frame sensed the channel to be busy. The channel load may be measured by means of a physical carrier sense mechanism or a virtual carrier sense mechanism. For example, the Physical carrier sense mechanism gives the indication of the channel busy/idle using PHY-CCA indication primitive and Virtual carrier sense mechanism announces the impending use of the medium, i.e., using Network Allocation Vector (NAV) value.

The access point may also generate and maintain a channel quality table for keeping track of the channels and the corresponding operating class based on the detection of radar signal in the channels and the channel load value obtained from the Channel Load Measurement Report frame.

In an aspect, the Basic Spectrum Measurement Report frame may include an OFDM signal field, to identify the presence of OFDM signals not related to IEEE 802.11. The Basic Spectrum Measurement Request frame may also contain an unidentified signal field for identifying non-IEEE 802.11 frames excluding radar signals. A radar field is also included for detecting any radar interference on the corresponding channel.

The wireless access point may send the Basic Spectrum Measurement Request frame and the Channel Load Measurement Request frame to one or more selected stations. In an aspect, the Channel Load measurement request frame may be sent when the Transmission Failed to Attempted Ratio for the operating channel is greater than a TFAR_Threshold. The TFAR_Threshold may be a threshold predetermined by the network administrator. In another aspect, the Channel Load measurement request frame is sent based on the channel load of the operating channel being greater than the channel load of any other channel by a margin of CL_Threshold. The CL_Threshold may be a threshold predetermined by the network administrator. The Basic Spectrum Measurement Request frame is sent only for the channels under DFS region. The access point may determine whether to dynamically switch to another channel or not based on the detection of radar in any of the channels, Transmission Failed to Attempted Ratio for the operating channel being greater than the TFAR_Threshold, or channel load of the operating channel being greater than the channel load of any other channel by CL_Threshold.

Figure 6:
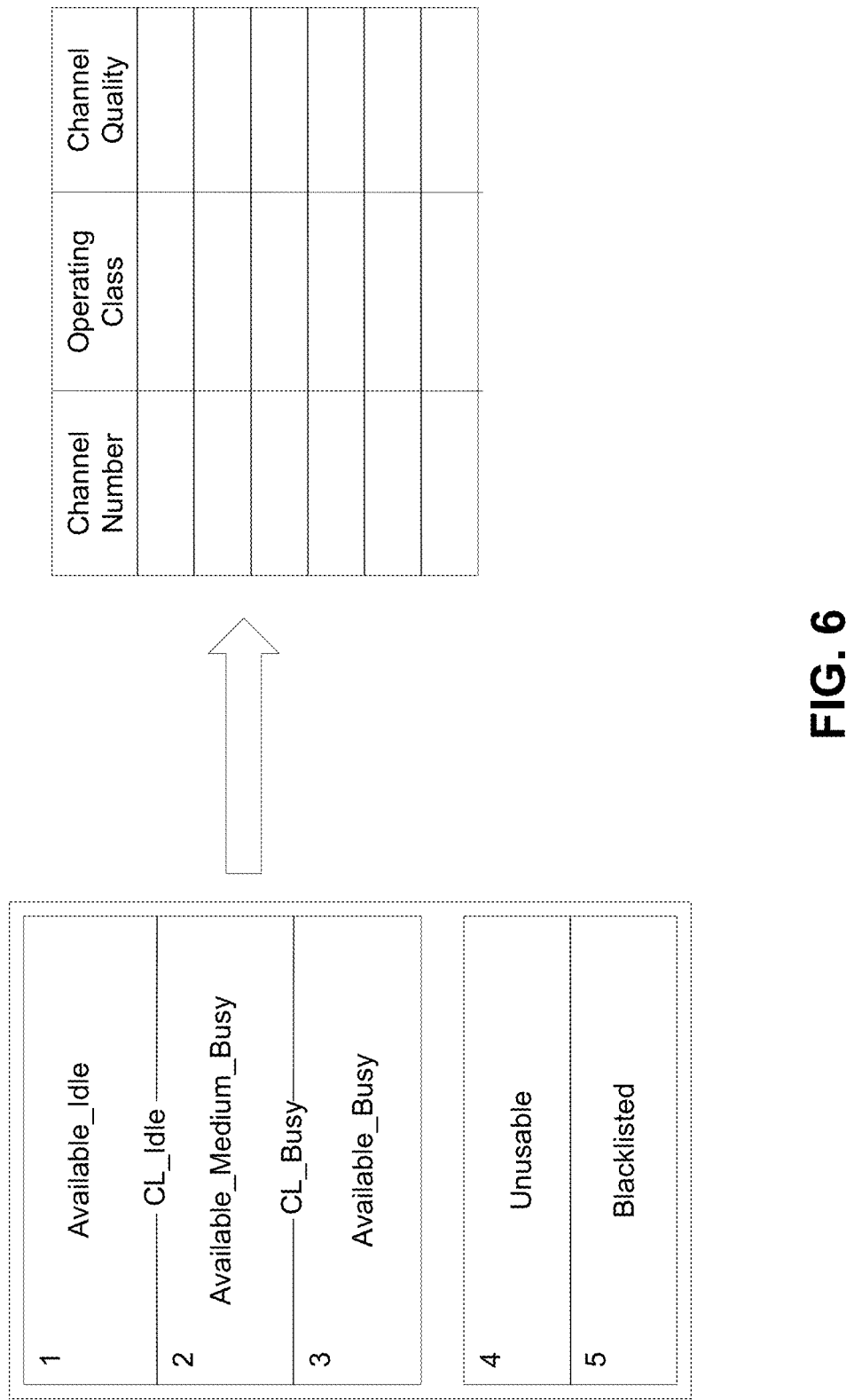
FIG. 6 depicts a schematic diagram of channel quality table in accordance with an embodiment.

FIG. 6 depicts a schematic diagram of channel quality table in accordance with an embodiment. The Channel Quality Table enables keeping track of the various channels and the operating classes as per the channel load in the channel load report frame and the usability of the channels depending on the detection of radar signal in the channels. In an aspect, the best channel estimation may take into account the channel quality table maintained by the access point. Initially the channel quality table may be populated with an operating class along with bandwidth in decreasing order. Such an initial channel quality table gives priority to the channels with higher bandwidth, hence, the access point will have the feasibility of selecting the best channel with higher bandwidth much faster. During the operation of the access point, the channels and the operating classes may be updated in the channel quality table as per the channel load value received in channel load report frame. In case, a Radar bit in a Basic Measurement report is detected to be 1 for a non-operating channel then the access point may update the Channel Quality Table. In an aspect, the access point may maintain 5 categories in the channel quality table—Available_Idle, Available_Medium_busy, Available_Busy, Unusable and Blacklisted. The Available_Idle, Available_Medium_busy, Available_Busy are the categories under which the channels are available for normal functioning depending on the channel load of said channel.

In an embodiment, Available_Idle may be the category under which the channels having a channel load value lesser than a defined threshold 'CL_Idle' are categorized. Available_Busy may be the category under which the channels having a channel load value more than a defined threshold 'CL_Busy' are categorized. Available_Medium_busy may be the category under which the channels having a channel load value more than 'CL_Idle' but less than 'CL_Busy' are categorized. In another aspect, Blacklisted category may include channels on which a radar signal is detected and hence are of no use till the expiry of a NON-OCCUPANCY PERIOD (NOP). Such NON-OCCUPANCY PERIOD may be defined by the regulatory domain. The channel under Blacklisted category are scanned again after the expiry of the NON-OCCUPANCY PERIOD and if a radar signal is not detected upon scanning then the channel is categorized under one of the Available_Idle, Available_Medium_busy, and Available_Busy categories based on the channel load value of said channel. In yet another aspect, the Unusable category may include channels having a part of the frequency spectrum affected by radar signals. In other words the channels under Unusable category share a part of the frequency spectrum with the channels under Blacklisted category. Once, the corresponding Blacklisted channel or channels sharing a part of the frequency spectrum with an Unusable channel is shifted to another category upon scanning, the Unusable channel is also shifted to another category such as Available_Idle, Available_Medium_busy, and Available_Busy based on its channel load value in the channel load report frame. In an aspect, the Available_Idle channels may be scanned more frequently for detecting a radar signal than the Available_Medium_busy and Available_Busy Channels.

Figure 7:
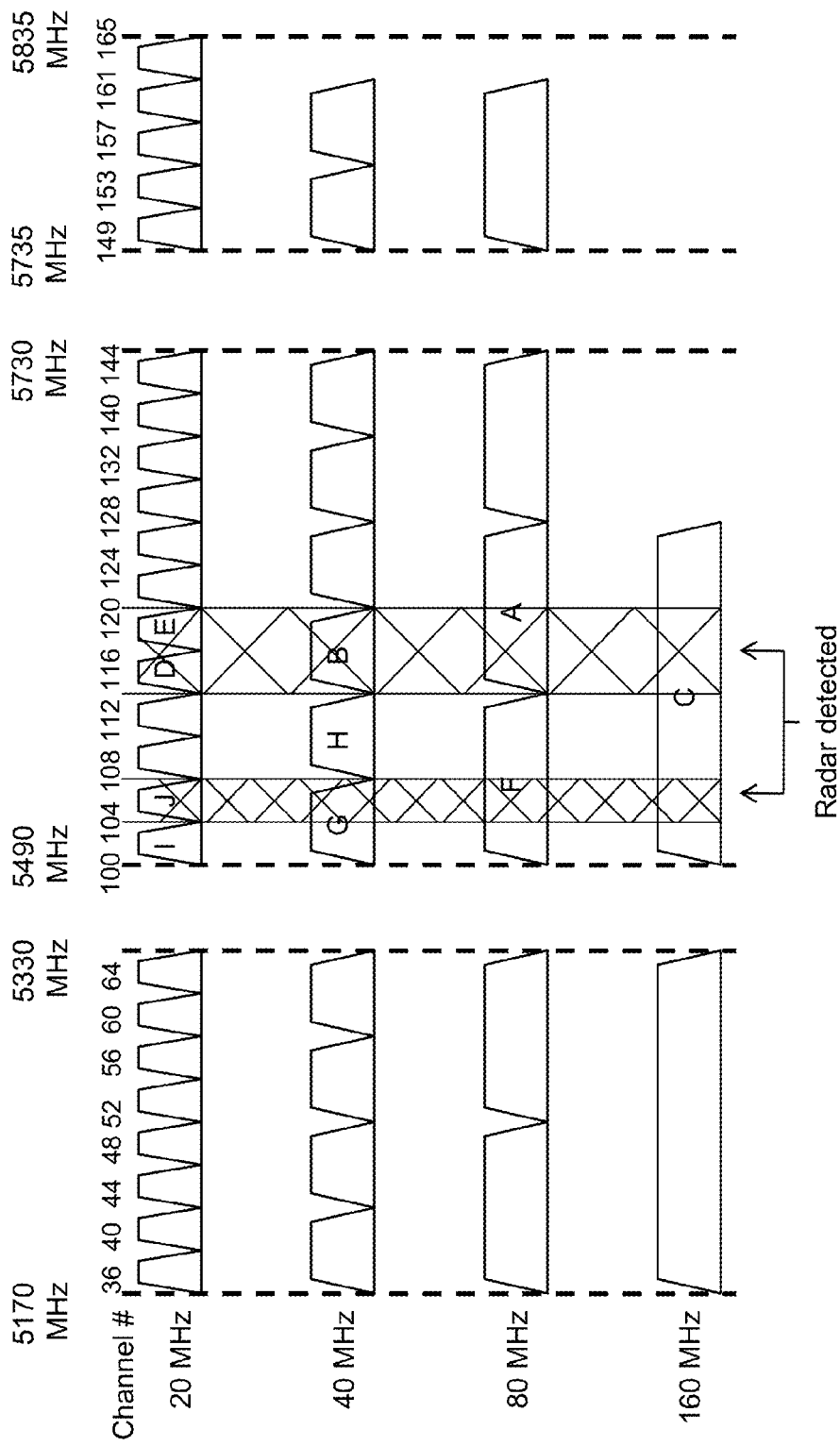
FIG. 7 illustrates wideband channel categorization in the channel quality table in case a radar signal is detected in an operating channel.

FIG. 7 illustrates an exemplary wideband channel categorization in the channel quality table in case a radar signal is detected in an operating channel. In the present example, Channel-A is the operating channel being used by the access point having a frequency spectrum of 80 MHz, Channel-B has a frequency spectrum of 40 MHz, Channel-C has a frequency spectrum of 160 MHz, and Channel-D and Channel-E has a frequency spectrum of 20 MHz each. In case, a radar signal is detected in Channel-B and covers the whole spectrum of 40 MHz then Channel-B will be categorized under Blacklisted for a fixed NON-OCCUPANCY PERIOD. Since, Channel-A, Channel-C, Channel-D and Channel-E share only certain parts of the frequency with Channel-B, they will be categorized under Unusable. Upon the expiry of the NON-OCCUPANCY PERIOD, Channel-B i.e. the Blacklisted channel is scanned for detecting the presence of a radar signal. In case, a radar signal exits in Channel-B even after the NON-OCCUPANCY PERIOD, the Channel Quality Table is not updated. However, if radar is not detected in Channel-B then channel load for Channel-B is measured using the corresponding Channel Load Report Frame and is then categorized under one of the Available_Idle, Available_Medium_busy, and Available_Busy categories. Channel-A, Channel-C, Channel-D, and Channel-E that were categorized under Unusable categories are also re-categorized under one of the Available_Idle, Available_Medium_busy, and Available_Busy categories based on their respective channel loads measured using the corresponding Channel Load report frames. Similarly, if radar is detected in Channel-J then the same is categorized under Blacklisted and Channel-C, Channel-G and Channel-F that share a part of their spectrum with Channel-J are categorized under Unusable, however, Channel-A will not be categorized under Unusable since it no longer shares the bandwidth with the Blacklisted Channel.

Once the access point has determined to switch to another channel it estimates a best channel for switching. In an aspect, the best channel estimation may take into account the channel quality table maintained by the access point. The channel quality table may categorize the various channels based on the channel load report of each channel and the presence of radar signal in any channel. In an aspect, the Channel Quality Table may categorize the channels under one of the categories selected from a group comprising of Available_Idle, Available_Medium_busy, Available_Busy, Unusable and Blacklisted. The channels in which a radar signal is detected covering the whole spectrum of the channels are categorized under Blacklisted category. The channels that share a part of the spectrum with Blacklisted channels are categorized under Unusable category.

In another aspect, the best channel estimation may take into account the distance of the desired bandwidth to be used for creating a new or second BSS from the bandwidth used by an existing or first BSS.

In yet another aspect, the best channel estimation may take into account the E.I.R.P of the estimated channel. The access point may select the channel for switching with lowest E.I.R.P in comparison to the channels available for switching.

Figure 9:
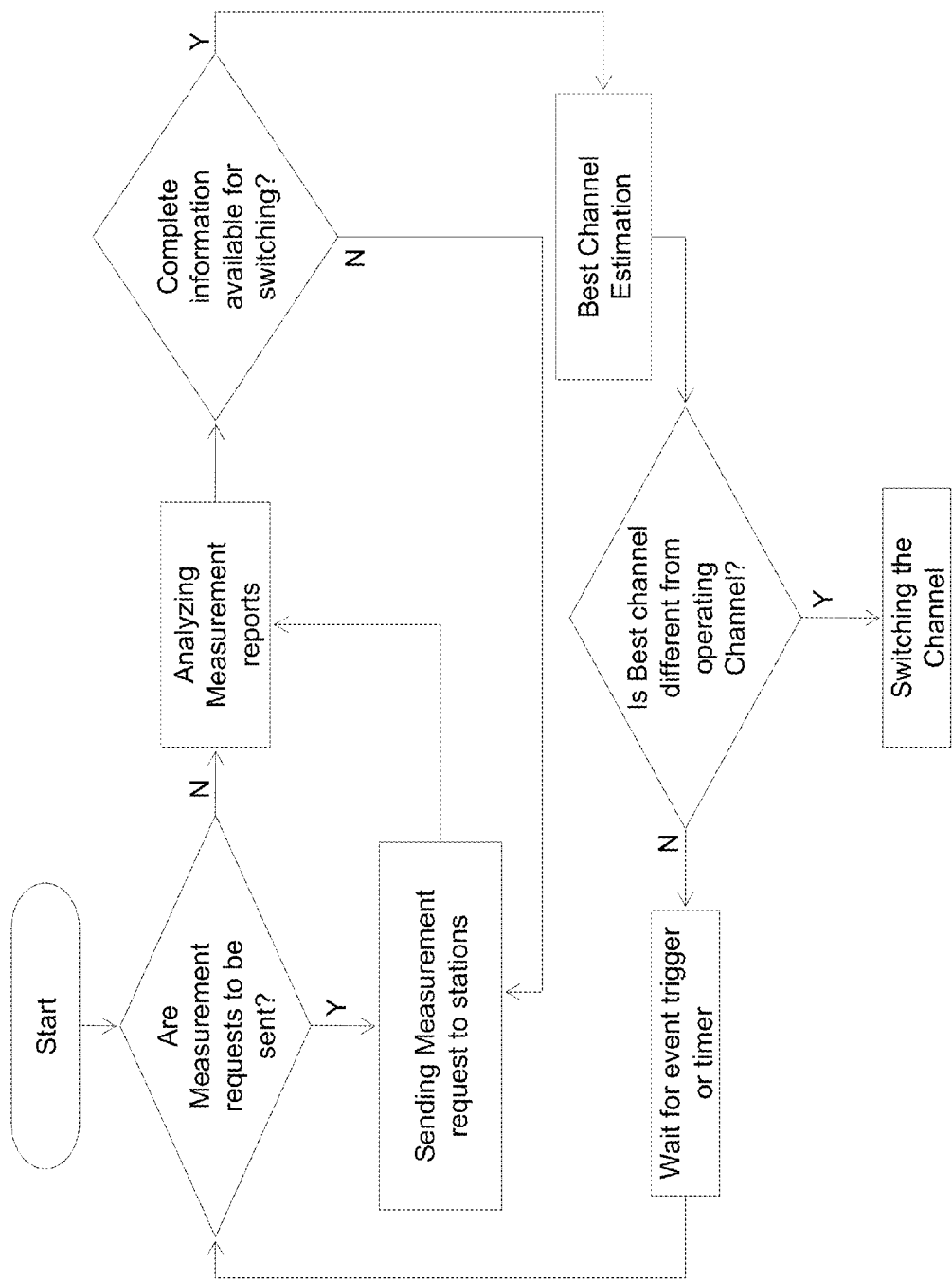
FIG. 9 illustrates a method for dynamic selection of a wideband channel from a group of channels in an available band spectrum, in accordance with an embodiment.

FIG. 9 describes a method for dynamically selecting a wideband channel from a group of channels in an available band spectrum. The access point as well as the stations may be provided with means for detecting a radar signal by a wireless access point or by one or more stations. The detection of radar signal in the operating as well as other channels may be a continuous process that triggers the process of selecting a new wideband channel for switching. The measurement requests may be of two types mainly a Basic Spectrum Measurement Request frame and a Channel Load Measurement Request frame. In an aspect, the Basic Spectrum Measurement Request frame may be sent by the access point to the stations upon detection of the radar signal in any of the channels. The Channel Load Measurement Request frame may be sent if no radar is detected in the channel after the expiry of the Non-Occupancy Period. In another aspect, the channel load measurement request for monitoring the operating and non-operating channels may be sent periodically by the access point to the stations upon triggering of a timer based event. A Transmission Failed to Attempted Ratio for the wideband operating channel as well as a wideband Transmission Failed to Attempted Ratio histogram may be maintained by the access point for determining the performance of various possible channel bandwidths of the operating channel. A Basic Spectrum Measurement Report frame and a Channel Load Measurement Report frame may be transmitted by the stations to access point. In an aspect, the Basic Spectrum Measurement Report frame and the Channel Load Measurement Report frame are generated and sent in response to the reception of a corresponding Basic Spectrum Measurement Request and a corresponding Channel Load Measurement Request frame respectively. In another aspect, the Basic Spectrum Measurement Request frame is sent to the stations to measure the channel where radar was detected after the expiry of the Non-Occupancy Period. In yet another aspect, the Basic Spectrum Measurement Report frame may be generated autonomously by the stations based on the detection of radar signal in any of the channels.

The access point keeps estimating the best channel and updating the Channel Quality table as per the measurement reports received corresponding to the Basic Spectrum Measurement Request frame, and the Channel Load Measurement Request frame. In an aspect, for switching to the best available wideband channel the performance of various possible channel bandwidths of the operating channel is analyzed by utilizing the wideband Transmission Failed to Attempted Ratio histogram maintained by the access point. The primary channel of the operating wideband channel is retained if the Transmission Failed to Attempted Ratio of some of the channel bandwidth of the operating channel is lower than the estimated channels for selection.

In an embodiment, the step of switching to a wideband channel in case one or more wideband channels are available for selection may include selecting the channel nearer to the operating channel and retaining the primary channel while switching, in case the selected channel shares the spectrum of the primary channel of the operating wideband channel. In an aspect, if the wideband channel for selection is adjacent to the operating channel then the access point may extend the bandwidth for creating a new operating channel. In a related aspect, if the access point performs channel switching while retaining the primary channel, then the position of the primary channel remains same, and the new added spectrum may form secondary channel.

The method for dynamically switching to an available wideband channel may consider a channel quality table maintained by the access point while estimating a channel for switching. The Channel Quality Table may include an Available_Idle field, an Available_Medium_busy field, Available_Busy field, Unusable field and Blacklisted field for categorizing the channels. In an aspect, the access point sends the Channel Load Measurement Request frame more frequently to Available_Idle channels in comparison to Available_Medium_busy channels and Available_Busy channels. In another aspect, the access point sends the Channel Load Measurement Request frame less frequently to Available_Busy channels in comparison to Available_Medium_busy channels and Available_Idle channels. In yet another aspect, the access point sends the Channel Load Measurement Request frame less frequently to Available_Medium_busy channels in comparison to Available_Idle channels and more frequently in comparison to Available_Busy channels.

In an embodiment, the access point may perform channel switching without retaining the primary channel, for example, in case the access point is forming a BSS in an idle channel that lies either at the starting or ending position of the sub-band of the spectrum, then the primary may be chosen in the middle of the sub-band, so that there is higher probability of retaining the primary channel.

In an aspect, if the access point is the first to create a BSS, then it may choose the first channel with the low E.I.R.P. allowed, e.g. first 40 MHz (5150-5190 MHz) channel in the 5150-5350 MHz band. In another aspect, if the access point is second to create the BSS, then it chooses the last channel, i.e., 40 MHz (5310-5350 MHz) channel in the 5150-5350 MHz band with low E.I.R.P. and farthest from the first or existing BSS.

In embodiment a wireless access point apparatus operating in an operating channel for dynamically selecting a wideband channel from a group of channels in an available band spectrum is described. In an aspect, the wireless access point may be compliant with IEEE 802.11ac and communicatively coupled with the one or more stations. The access point comprise of a radar detection module, a frame generation module, a timer, and a processor module. The radar detection module may enable detecting presence of a radar signal in the operating channel. The frame generation module may enable generating a Basic Spectrum Measurement Request frame and a Channel Load Measurement Request frame. The timer may trigger sending of the Basic Spectrum Measurement Request frame and sending of the Channel Load Measurement Request frame to one or more stations. The processor module may enable maintaining a channel quality table, estimating one or more available Wideband Channels and selecting a wideband channel for operation based on the estimated available Wideband Channels and detection of radar signal in the operating channel. The estimation and selection of wideband channel may be based on the conditions as described above in the description.

Embodiments of the present invention may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the computer-readable medium or by copying the code from the computer-readable medium into another computer-readable medium (e.g., a hard disk, RAM, etc.) or by transmitting the code on a network for remote execution. Various methods described herein may be practiced by combining one or more computer-readable media containing the code according to the present invention with appropriate standard computer hardware to execute the code contained therein. An apparatus for practicing various embodiments of the present invention may involve one or more computers (or one or more processors within a single computer, or one or more processor cores) and storage systems containing or having network access to computer program(s) coded in accordance with various methods described herein, and the method steps of the invention could be accomplished by modules, routines, subroutines, or subparts of a computer program product.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

In the foregoing description, certain terms have been used for brevity, clearness, and understanding. No unnecessary limitations are to be implied there from beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

Moreover, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The preceding description has been presented with reference to various embodiments. Persons skilled in the art and technology to which this application pertains will appreciate that alterations and changes in the described structures and methods of operation can be practiced without meaningfully departing from the principle, spirit and scope.

The invention claimed is:

1. A wireless communication network for dynamic selection of a wideband channel from a group of channels in an available band spectrum comprising:
 a wireless access point operating in a wideband operating channel, wherein the wireless access point is enabled to:

a. detect a radar signal in the wideband operating channel,
b. compute and update a Transmission Failed to Attempted Ratio for the wideband operating channel,
c. compute and update a wideband Transmission Failed to Attempted Ratio histogram for each of possible channel bandwidths of the wideband operating channel,
d. send a Basic Spectrum Measurement Request frame, and
e. send a Channel Load Measurement Request frame;

one or more stations communicatively coupled with the wireless access point, wherein the one or more stations are enabled to:
a. detect a radar signal in one or more channels in the group of channels in the available band spectrum,
b. generate and send a Basic Spectrum Measurement Report frame either autonomously or in response to the Basic Spectrum Measurement Request frame, and
c. generate and send a Channel Load Measurement Report frame in response to the Channel Load Measurement Request frame;

wherein the wireless access point sends the Basic Spectrum Measurement Request frame and the Channel Load Measurement Request frame to one or more selected stations based on a timer or trigger event, and dynamically selects a wideband channel for operation from the group of channels in the available band spectrum based on the detection of radar signal in the channels, the Transmission Failed to Attempted Ratio for the wideband operating channel, the wideband Transmission Failed to Attempted Ratio histogram, the Basic Spectrum Measurement Report frame, and the Channel Load Measurement Report frame.

2. The wireless communication network as claimed in claim 1 wherein the wireless access point is an IEEE 802.11 access point.

3. The wireless communication network as claimed in claim 2 wherein the wireless access point is an IEEE 802.11ac access point.

4. The wireless communication network as claimed in claim 1 wherein the available band spectrum is 5 GHz.

5. The wireless communication network as claimed in claim 1 wherein each channel exist in an operating class having frequency bandwidths selected from a group comprising of 20 MHz, 40 MHz, 80 MHz, 160 MHz and 80+80 MHz.

6. The wireless communication network as claimed in claim 1 wherein the wireless access point selects the one or more stations for sending the Basic Spectrum Measurement Request frame and the Channel Load Measurement Request frame based on data traffic handled by the stations.

7. The wireless communication network as claimed in claim 1 wherein the one or more stations generate and send the Basic Spectrum Measurement Report frame, and the Channel Load Measurement Report frame in response to the received Basic Spectrum Measurement Request frame and the Channel Load Measurement Request frame respectively.

8. The wireless communication network as claimed in claim 1 wherein the one or more stations generate and send the Basic Spectrum Measurement Report frame in response to the detection of radar signal presence in one or more channels.

9. The wireless communication network as claimed in claim 1 wherein the trigger event is based on the Transmission Failed to Attempted Ratio being greater than a TFAR_Threshold.

10. The wireless communication network as claimed in claim 1 wherein wideband Transmission Failed to Attempted Ratio histogram includes the Transmission Failed to Attempted Ratio for each of possible channel bandwidths of the wideband operating channel.

11. The wireless communication network as claimed in claim 1 wherein the access point selects the wideband channel to create a new BSS with a desired bandwidth and that is farthest from the existing BSS.

12. The wireless communication network as claimed in claim 1 wherein the access point selects the channel with lowest E.I.R.P in comparison to the channels available for selection.

13. The wireless communication network as claimed in claim 1 wherein the Channel Load Measurement Report frame includes a channel load field indicating the percentage of time the station sending the Channel Load Measurement Report frame sensed the channel to be busy.

14. The wireless communication network as claimed in claim 13 wherein the channel load is measured by means of physical carrier sense mechanism or virtual carrier sense mechanism.

15. The wireless communication network as claimed in claim 13 wherein the trigger event is based on the channel load of the operating channel being greater than the channel load of any other channel by CL_Threshold.

16. The wireless communication network as claimed in claim 1 wherein the wireless access point creates and maintains a Channel Quality Table for keeping track of the channels and the corresponding operating class based on the detection of radar signal in the channels and the Channel Load Measurement Report frame.

17. The wireless communication network as claimed in claim 16 wherein the Channel Quality Table categorizes the channels under one of the categories selected from a group comprising of Available_Idle, Available Medium_busy, Available_Busy, Unusable and Blacklisted.

18. The wireless communication network as claimed in claim 17 wherein the channels with the channel load density less than a CL_Idle threshold fall under Available_Idle channel category.

19. The wireless communication network as claimed in claim 17 wherein the channels with the channel load density greater than a CL_Busy threshold fall under Available_Busy channel category.

20. The wireless communication network as claimed in claim 17 wherein the channels with the channel load density greater than the CL_Idle threshold and less than the CL_Busy threshold fall under Available_Medium_busy channel category.

21. The wireless communication network as claimed in claim 17 wherein the channels in which a radar signal is detected covering the whole spectrum of the channel are categorized under Blacklisted category.

22. The wireless communication network as claimed in claim 17 wherein the channels that share a part of the spectrum with Blacklisted channels are categorized under Unusable category.

23. A method for dynamically selecting a wideband channel from a group of channels in an available band spectrum comprising the steps of:
a. detecting a radar signal by a wireless access point or by one or more stations;

b. periodically computing and updating a Transmission Failed to Attempted Ratio for the wideband operating channel and a wideband Transmission Failed to Attempted Ratio histogram for each of the possible channel bandwidth of the operating channel by the access point, c. sending of a Basic Spectrum Measurement Request frame and a Channel Load Measurement Request frame by the wireless access point operating in an operating channel to one or more stations based on a trigger event or a timer;

d. generating and sending a Basic Spectrum Measurement Report frame and a Channel Load Measurement Report frame by the one or more stations to the wireless access point;

e. estimating one or more available Wideband Channels by analyzing the corresponding Basic Spectrum Measurement Report frame, the corresponding Channel Load Measurement Report frame and based on the detection of radar signal;

f. selecting a wideband channel for operation from the available Wideband Channels estimated in step e and based on the detection of radar signal in the operating channel, the wideband Transmission Failed to Attempted Ratio histogram the Basic Spectrum Measurement Report frame, and the Channel Load Measurement Report frames.

24. The method for dynamically selecting a wideband channel as claimed in claim 23 wherein selecting a wideband channel for operation from the estimated available Wideband Channels comprises:

a. analyzing the performance of possible channel bandwidths of the operating channel by utilizing the wideband Transmission Failed to Attempted Ratio histogram and retaining the primary channel if the Transmission Failed to Attempted Ratio of some of the channel bandwidth of the operating channel is lower than the estimated channels for selection;

b. switching to the selected channel for operation.

25. The method of claim 24, wherein if more than one wideband channels are available for selection then the access point selects the channel nearer to the operating channel and retains its primary channel while switching, in case the selected channel shares the spectrum of the primary channel.

26. The method of claim 24, wherein if the wideband channel for selection is adjacent to the operating channel then the access point extends the bandwidth for creating a new operating channel.

27. A method of claim 24, wherein if the access point performs channel switching while retaining the primary channel, then the position of the primary channel remains same, and the new added spectrum will form secondary channel.

28. The method for dynamically selecting a wideband channel as claimed in claim 23 wherein the trigger event for sending the Basic Spectrum Measurement Request frame includes the completion of Non-Occupancy Period after the detection of radar signal in the corresponding channel.

29. The method for dynamically selecting a wideband channel as claimed in claim 23 further comprising creating and maintaining a Channel Quality Table for keeping track of the channels and the corresponding operating class based on the detection of radar signal in the channels and the Channel Load Measurement Report frame.

30. The method for dynamically selecting a wideband channel as claimed in claim 29 wherein the Channel Quality Table includes an Available_Idle field, an Available_Medium_busy field, Available_Busy field, Unusable field and Blacklisted field for categorizing the channels.

31. The method for dynamically selecting a wideband channel as claimed in claim 30 wherein the access point sends the Channel Load Measurement Request frame more frequently to Available_Idle channels in comparison to Available_Medium_busy channels and Available_Busy channels.

32. The method for dynamically selecting a wideband channel as claimed in claim 30 wherein the access point sends the Channel Load Measurement Request frame less frequently to Available_Busy channels in comparison to Available_Medium_busy channels and Available_Idle channels.

33. The method for dynamically selecting a wideband channel as claimed in claim 30 wherein the access point sends the Channel Load Measurement Request frame less frequently to Available_Medium_busy channels in comparison to Available_Idle channels and more frequently in comparison to Available_Busy channels.

34. The method for dynamically selecting a wideband channel as claimed in claim 24, wherein if the access point performs channel switching without retaining any channel, or the access point is forming a BSS in an idle channel that lies either at the start or end position of the sub-band of the spectrum, then the primary may be chosen in the middle of the sub-band, so that it can have the higher probability of retaining the primary channel.

35. The method for dynamically selecting a wideband channel as claimed in claim 23 wherein sending the Basic Spectrum Measurement Request frame and the Channel Load Measurement Request frame is based on data traffic handled by the stations.

36. The method for dynamically selecting a wideband channel as claimed in claim 23 wherein generating and sending the Basic Spectrum Measurement Report frame, and the Channel Load Measurement Report frame is in response to the received Basic Spectrum Measurement Request frame and the Channel Load Measurement Request frame respectively.

37. The method for dynamically selecting a wideband channel as claimed in claim 27 wherein generating and sending the Basic Spectrum Measurement Report frame is in response to the detection of radar signal presence in one or more channels.

38. A method of selecting a channel to initiate BSS, wherein the access point selects the channel with the desired bandwidth which is farthest from any existing BSS.

39. A method of claim 38, wherein if the access point is the first to create the BSS, then it chooses the first channel with the low E.I.R.P. allowed in the 5150-5350 MHz band.

40. A method of claim 38, wherein if the access point is the second to create the BSS, then it chooses the last channel in the 5150-5350 MHz band with low E.I.R.P. and farthest from the first BSS.

* * * * *